No. 629,060. Patented July 18, 1899.
A. G. BAYLES.
DOOR BOLT.
(Application filed Mar. 16, 1899.)
(No Model.)
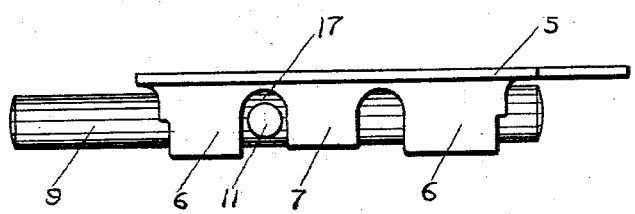
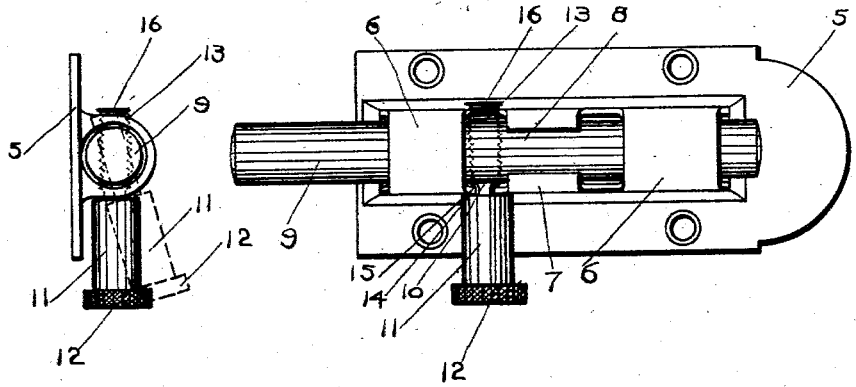
WITNESSES
Edward Winslow Geer
A. M. Cusack
INVENTOR
Alfred G. Bayles
BY
Garry P. Van Wye
ATTORNEY

UNITED STATES PATENT OFFICE.

ALFRED G. BAYLES, OF NEW YORK, N. Y.

DOOR-BOLT.

SPECIFICATION forming part of Letters Patent No. 629,060, dated July 18, 1899.

Application filed March 16, 1899. Serial No. 709,361. (No model.)

*To all whom it may concern:*

Be it known that I, ALFRED G. BAYLES, a citizen of the United States, residing at New York, in the county and State of New York, have invented a new and useful Door-Bolt, of which the following is a specification.

My invention relates to door-bolts, and especially to that class known in the art to which it appertains as "flush bolts," and has for its object to provide means to effectively lock the bolt, so that it cannot be thrown by an instrument inserted through a gimlet-hole in the door. I attain this object by means of the mechanism illustrated in the accompanying drawings, in which—

Figure 1 is a face view of a door-bolt constructed according to my improvement, the socket into which the end of the bolt is thrown being omitted. Fig. 2 is a top plan view of the same, and Fig. 3 is an end view thereof.

In the accompanying drawings like parts are designated by the same reference-numerals in each of the views, and in the practice of my invention I take an ordinary door-bolt, the plate of which is indicated by 5, which is provided with the usual screw-holes, by which it may be secured to a door, the housings at each end of the plate being indicated by 6 and the central housing by 7, which consists of two flanges, which partly inclose the bolt 9, leaving the passage 8, through which the shank of the bolt 11 may pass, all of these parts being a well-known construction.

The bolt 9 is provided with a screw-threaded hole 10, in which I mount a bolt 11, having a head 12 and a screw-threaded shank 13. The shank 13 is preferably smaller than the unthreaded part, whereby a shoulder 14 is formed, and between the threaded part 13 and the shoulder 14 is preferably formed an annular groove 15, and the free end of the threaded part is provided with a flange 16, which is preferably formed by pounding the free end of the bolt 11 with a hammer after the same is inserted in the hole 10 of the bolt 9. I prefer to so proportion the threaded part of the bolt 11 and the recesses formed between the housing 7 and the housings 6 that when the bolt 11 is in the position shown in full lines in Fig. 3 there will be a space 17 between the said bolt and the bottom of the recesses, as clearly shown in Fig. 2.

In operation the bolt 11 is unscrewed until the flange 16 will bear against the bolt 9, at which time the bolt 9 can be given a one-quarter turn, as is common with this class of bolts, and the bolt can be thrown in either direction by passing the bolt 11 through the passage 8, as will be readily understood. When the bolt is thrown and the bolt 11 is in the position shown in full lines in Fig. 3, by screwing the same into the hole 10 the end of said bolt will project upon the plate 5 and will prevent the turning of the bolt 9, so that the bolt 11 can pass through the passage 8. This will prevent the operation of the bolt 9 by boring a gimlet-hole through the door and throwing the bolt by means of a wire, as is occasionally done with bolts as now constructed.

The flange on the end of the bolt 11 will prevent the bolt being screwed out of the hole 10, and by forming the annular groove 15 between the shoulder 14 and the screw-threaded part 13 I am able to form a full thread on said threaded part up to the annular groove 15, so that the bolt can be screwed in until the shoulder 14 will bear against the bolt 9 or housings 6 and 7 without binding the screw.

By leaving the space 17 between the end of the bolt 11 and the bottom of the recess between the housings the bolt 11 can be drawn into the position indicated by dotted lines in Fig. 3 before operating or unscrewing the said bolt, thereby giving more space for the hand between the head of the bolt and the door, as will be readily understood.

While I have described the most approved form in which my invention is constructed, yet many changes of detail can be made without departing from the spirit of the same, such as providing other means instead of the groove to prevent the threads binding when the bolt is screwed home and the flange to prevent the bolt being turned out of the hole 10. I also prefer that the thread on the bolt 11 should be what is known as a "fast" thread, so that a half-turn or turn would carry the end far enough to bind and lock the bolt; but this is not essential, and I therefore reserve the right to make any changes which fairly come within the scope of my invention.

Having thus described my invention, what I claim as new, and desire to secure by Letters Patent of the United States, is—

1. A door-bolt comprising a casing provided with housings whereby two recesses are formed, the central housing being divided transversely centrally thereof to connect the said recesses, a rotary and sliding bolt with a screw-threaded hole therethrough mounted in said housings, a screw-threaded bolt mounted in said hole, and projecting through one of said recesses upon the said casing at its opposite ends when in a locked position, said last-named bolt being provided at the free end of the screw-threaded portion with means to prevent the same being screwed out of the said hole, and at the opposite end of said screw-threaded portion with means to prevent the binding of the screw in the said hole when screwed in as far as the same will go.

2. In a door-bolt, a casing provided with housings whereby two recesses are formed, the central housing being divided transversely centrally thereof to connect the said recesses, a rotary and sliding bolt having a screw-threaded hole therethrough mounted in said housings, a screw-threaded bolt mounted in said hole and adapted to project through one of said recesses upon the said casing at its opposite ends when in a locked position, and being provided with an annular groove between the screw-threaded part and the shoulder on said bolt, whereby binding of the screw in said hole is prevented, substantially as and for the purpose described.

3. In a door-bolt, a casing provided with housings whereby two recesses are formed, the central housing being divided transversely centrally thereof to connect the said recesses, a rotary and sliding bolt having a screw-threaded hole therethrough mounted in said housings, a screw-threaded bolt mounted in said hole, and provided at one end with a flange to prevent the withdrawal of the same, and also provided adjacent to the screw-threaded portion with a shoulder to limit the inward motion of the bolt and with an annular groove between said screw-threaded portion and said shoulder whereby the binding of the screw in said hole is prevented, said last-named bolt projecting through one of said recesses upon the said casing at its opposite ends when in a locked position, said first-named bolt being capable of being slid in said housings when said second bolt is unscrewed, the second bolt passing through the said transverse opening of the central housing, substantially as and for the purpose set forth.

In testimony that I claim the above I have hereto affixed my signature in the presence of two witnesses.

ALFRED G. BAYLES.

Witnesses:
 EDWARD WINSTON GEER,
 A. M. CUSACK.